(12) United States Patent
Rydlewski et al.

(10) Patent No.: US 11,999,517 B2
(45) Date of Patent: Jun. 4, 2024

(54) DEVICE AND METHOD FOR MANUFACTURING A BAG RECEIVED IN AN ENVELOPE

(71) Applicant: Teepack Spezialmaschinen Gmbh & Co. KG, Meerbusch (DE)

(72) Inventors: Thomas Rydlewski, Düsseldorf (DE); Alexander Bromm, Hürth (DE); Klaus Baltes, Bergheim (DE); Stefan Lambertz, Meerbusch (DE); Hans Knops, Krefeld (DE)

(73) Assignee: Teepack Spezialmaschinen GmbH & Co. KG, Meerbusch (DE)

( * ) Notice: Subject to any disclaimer, the term of this patent is extended or adjusted under 35 U.S.C. 154(b) by 76 days.

(21) Appl. No.: 17/317,017

(22) Filed: May 11, 2021

(65) Prior Publication Data

US 2021/0354864 A1    Nov. 18, 2021

(30) Foreign Application Priority Data

May 12, 2020  (EP) .................................... 20174044

(51) Int. Cl.
*B65B 29/02*  (2006.01)
*B29C 65/00*  (2006.01)
(Continued)

(52) U.S. Cl.
CPC ........ *B65B 29/028* (2017.08); *B29C 66/1122* (2013.01); *B29C 66/43121* (2013.01);
(Continued)

(58) Field of Classification Search
CPC . B29C 65/18; B29C 65/7882; B29C 65/7885; B29C 66/1122; B29C 66/244;
(Continued)

(56) References Cited

U.S. PATENT DOCUMENTS 1,976,691 A * 10/1934 Rambold ................ B65B 61/24
                                                                 53/526
2,087,236 A *  7/1937 Anders .............. B65D 85/8085
                                                                 53/413
(Continued)

FOREIGN PATENT DOCUMENTS

DE    29609717 U1    8/1996
DE    10126202 A1   12/2002
(Continued)

OTHER PUBLICATIONS

European Search Report for European Patent Application No. 20174044.6 dated Nov. 5, 2020, 7 pages.
(Continued)

*Primary Examiner* — Robert F Long
*Assistant Examiner* — Eduardo R Ferrero
(74) *Attorney, Agent, or Firm* — Dorsey & Whitney LLP

(57) ABSTRACT

The present invention relates to a device and a method for manufacturing a bag received in an envelope and containing a brewable material with a bag manufacturing means which is configured to manufacture a bag containing brewable material, and with a sealing station with a sealing jaw element and a counter-jaw element which act on the envelope from opposite sides to seal in the bag. The device is further developed for a reliable and safe manufacture of the packing unit consisting of a bag and an envelope by the sealing jaw element being fixed to a sealing jaw swivel arm at which a sealing jaw connecting rod is applied, and the counter-jaw element being fixed to a counter-jaw swivel arm at which a counter-jaw connecting rod is applied, and by the sealing jaw connecting rod and the counter-jaw connecting rod being each eccentrically connected to a common drive shaft of a servomotor. In the method according to the invention, the contact force between the sealing jaw element and the counter-jaw element is controlled via the torque of
(Continued)

the servomotor actuating the sealing jaw element and/or the counter-jaw element.

18 Claims, 7 Drawing Sheets

(51) Int. Cl.
  *B29L 31/00* (2006.01)
  *B65D 85/808* (2006.01)
(52) U.S. Cl.
  CPC ..... *B29C 66/849* (2013.01); *B29L 2031/7122* (2013.01); *B65D 85/8085* (2013.01)
(58) Field of Classification Search
  CPC .............. B29C 66/3452; B29C 66/431; B29C 66/43112; B29C 66/4332; B29C 66/73921; B29C 66/81463; B29C 66/8221; B29C 66/82265; B29C 66/8243; B29C 66/83241; B29C 66/849; B29C 66/02; B29L 2031/7122; B65B 11/28; B65B 11/48; B65B 29/028; B65B 49/00; B65B 51/14; B65B 51/146; B65B 65/02; B65D 75/20; B65D 85/8085
  USPC ... 53/134.2, 374.3, 374.5, 374.6, 234, 284.7
  See application file for complete search history.

(56) References Cited

U.S. PATENT DOCUMENTS

| | | | | |
|---|---|---|---|---|
| RE20,881 E * | 10/1938 | Rambold | ............. | B65B 29/028 53/73 |
| 2,348,201 A * | 5/1944 | Barnett | .................... | B29C 65/30 53/134.1 |
| 2,614,934 A * | 10/1952 | Trotman | ............ | B65D 85/8085 426/83 |
| 2,780,042 A * | 2/1957 | Irmscher | .............. | B65B 29/028 53/389.5 |
| 2,860,989 A * | 11/1958 | Geisinger | .......... | B65D 85/8085 206/0.5 |
| 2,881,574 A * | 4/1959 | Wardell | ................ | B65B 29/028 73/52 |
| 2,899,045 A * | 8/1959 | Irmscher | ............ | B65D 85/8085 206/0.5 |
| 3,223,229 A * | 12/1965 | Welin-Berger | ........... | B65B 9/06 426/79 |
| 3,566,573 A * | 3/1971 | Irmscher | ................. | B65B 29/04 426/77 |
| 3,774,369 A * | 11/1973 | Klar | ........................ | B65B 29/04 53/232 |
| 4,154,853 A * | 5/1979 | Rambold | ........... | B65D 85/8085 206/0.5 |
| 4,265,074 A * | 5/1981 | Reuter | .............. | B29C 66/91212 53/374.6 |
| 4,458,811 A * | 7/1984 | Wilkinson | .......... | B29C 66/1122 206/219 |
| 5,787,681 A * | 8/1998 | Papina | .................... | B29C 66/80 53/550 |
| 6,637,175 B2 * | 10/2003 | Ghirlandi | ................ | B65B 51/16 53/413 |
| 8,333,050 B2 * | 12/2012 | Rea | ....................... | B29C 66/431 53/232 |
| 9,902,516 B2 * | 2/2018 | Haddow | ................. | B65B 51/18 |
| 9,932,136 B2 * | 4/2018 | Lambertz | ................ | B65B 29/04 |
| 2002/0073660 A1 * | 6/2002 | Fukuda | ............... | B29C 66/7373 53/551 |
| 2002/0139087 A1 * | 10/2002 | Ghirlandi | .............. | B65B 29/028 53/413 |
| 2004/0261370 A1 * | 12/2004 | Rea | ..................... | B29C 66/3452 53/562 |
| 2005/0268577 A1 * | 12/2005 | Kuss | ....................... | B29C 65/02 53/551 |
| 2006/0201113 A1 * | 9/2006 | Conti | ..................... | B65B 9/023 53/529 |
| 2006/0207619 A1 * | 9/2006 | Conti | .................... | B65B 29/025 131/322 |
| 2011/0000613 A1 * | 1/2011 | Cigallio | ................. | B29C 65/26 156/290 |
| 2011/0232229 A1 * | 9/2011 | Rea | ....................... | B29C 66/849 53/167 |
| 2011/0297676 A1 * | 12/2011 | Korte | ..................... | B65D 77/04 220/23.9 |
| 2012/0080418 A1 * | 4/2012 | Sakamoto | ......... | B29C 66/91443 219/243 |
| 2012/0125521 A1 * | 5/2012 | Dersch | .............. | B29C 66/83543 156/73.1 |
| 2012/0167531 A1 * | 7/2012 | Lachenmaier | .... | B29C 66/83221 53/479 |
| 2015/0047991 A1 * | 2/2015 | Rivola | .................. | B29C 66/244 206/0.5 |
| 2015/0291347 A1 * | 10/2015 | Rivola | ................... | B65B 61/08 426/77 |
| 2016/0332755 A1 * | 11/2016 | Yasuda | ................... | B65B 57/10 |
| 2019/0210753 A1 * | 7/2019 | Badini | ................. | B29C 66/849 |

FOREIGN PATENT DOCUMENTS

| | | |
|---|---|---|
| EP | 1153833 A1 | 11/2001 |
| EP | 1479612 A1 | 11/2004 |
| EP | 2231479 B1 | 8/2011 |
| EP | 2572996 A1 | 3/2013 |
| EP | 2626318 A1 | 8/2013 |
| JP | H10194216 A | 7/1998 |
| JP | 2003200911 A | 7/2003 |
| JP | 2012511481 A | 5/2012 |
| JP | 2014009028 A | 1/2014 |
| WO | 0021834 A1 | 4/2000 |
| WO | 0162600 A1 | 8/2001 |
| WO | 2009101686 A1 | 8/2009 |
| WO | 2012117308 A1 | 9/2012 |
| WO | 2018047051 A1 | 3/2018 |

OTHER PUBLICATIONS

Office Action dated Jun. 24, 2020 in connection with Japanese patent application 2021-080881, 8 pages including English translation.
Office Action dated Jul. 15, 2022 in connection with Chinese patent application No. 202110517741.7, 19 pages including English translation.

* cited by examiner

DEVICE AND METHOD FOR MANUFACTURING A BAG RECEIVED IN AN ENVELOPE

CROSS-REFERENCE TO RELATED APPLICATION

This application claims priority to European Patent Application No. 20174044.6, filed May 12, 2020 and entitled "Device and Method For Manufacturing a Bag Received in an Envelope", which is hereby incorporated by reference herein in its entirety for all purposes.

FIELD

The present invention relates to a device for manufacturing a package unit comprising a bag containing a brewable material and provided in a usually flavour-tight envelope.

BACKGROUND

A generic device having the features of the preamble is known from EP 2 231 479 B1. In said known device, the bag is initially placed between two opposite legs between an envelope material supplied as a flat web in an enveloping station by placing the bag onto the web and folding the latter around the bag and cutting it from a supplied envelope material, so that an envelope material piece of a prefabricated length receives the bag within it. By folding the envelope material, one border of the envelope of the bag is already formed. However, it is required to form a sealed seam formed in a U-shape so that the envelope is circumferentially closed around the bag and a flavour-tight package of the brewable material results within the bag.

This brewable material normally is a tea or any other infusible material of dried powder or leaves whose quality and taste can be affected by environmental influences, so that the above-mentioned flavour-tight package can be necessary. This also applies to the present invention.

The forming of the U-shaped sealed seam is done, in the above-mentioned prior art, by a sealing means comprising, at the outer periphery of a carousel, a plurality of sealing units which each separately comprise sealing jaws that can be pivoted with respect to each other and receive the envelope together with the bag and are closed during a stepwise rotary motion of the carousel to seal, during the rotary motion of the carousel, the U-shaped borders of the envelope by welding and to discharge the envelope closed in this way at another station.

SUMMARY

This embodiment is based on the consideration that, with respect to other stations of the previously known device, the sealing-in of the bag in the envelope necessitates a longer dwelling time in the sealing station than in the previous stations due to the formation of welded seams. Thus, the individual process steps in the sealing station can be temporally split by rotating the carousel without interrupting or disturbing the clocking of the overall device.

To effectively seal in the envelope in particular during welding, it is necessary to bring the envelope with its borders between the sealing jaws, to place the sealing jaws against the envelope, to introduce a sufficient quantity of heat into the envelope to at least initially melt it such that the webs of the envelope abutting against each other melt on and are welded together. This sealing is not yet directly dimensionally stable due to the introduced heat and the required cooling time, so that the packing unit consisting of the bag and the envelope can usually only be further processed after a certain cooling time has been observed.

Since the device for manufacturing the packing unit is a means for the mass production of consumables, a fast clocking and an economic manufacture of the packing unit are essential.

A device of the type mentioned in the beginning contains a plurality of stations having a plurality of machine elements and machine components which interact with the bag to be produced or with components thereof. In view of the clocked process, a precise control of the individual machine elements and components is required. In order to avoid a damage in case of a faulty control and/or a failure of the drive, the respective machine elements and components are usually driven by one single drive and forcibly guided by transmission elements that act essentially free from slippage, such as chains, gearwheels, sprocket belts or connecting link guides. In this way, the individual machine elements and components move relative with respect to each other on predetermined trajectories and cannot collide with each other even if the control or the motor fails.

However, this embodiment is cumbersome with respect to the predetermination of the kinematic processes, even if only one single drive has to be installed. In particular with cooperating elements, exacting tolerances have to be observed. All movements follow a circumferentially closed trajectory due to the permanent rotation of the drive. In cooperating machine components which clamp or press the bag or a portion thereof between them, springs are typically employed since due to a certain clearance within the transmission, an exact control of the approach of the individual components towards the bag or its components cannot be safely ensured without certain tolerance compensations.

The present invention wants to improve the previously known device in this respect and in particular provide a sealing station permitting a reliable and secure sealing of the bag within the envelope.

To this end, the present invention suggests a device having the features of claim 1.

The device according to the invention comprises, in a manner known per se, a bag manufacturing means. The latter does not have to differ from the bag manufacturing means described in EP 2 231 479 B1. As an alternative, however, it can also be embodied according to EP 2 626 318 A1, EP 1 479 612 A1, EP 2 572 996 A1, or EP 1 153 833 A1. Here, the bag manufacturing means can be embodied such that, together with the bag, a thread is also connected thereto whose other end is provided with a label, as it is known, for example, from EP 2 231 479 B1.

The device according to the invention furthermore has a sealing station to enclose the bag in an envelope, optionally together with the thread and the label. This sealing station is usually embodied such that the bag is received in the envelope in a flavour-tight manner. The envelope is known as such, for example, from DE 296 09 717 U1. In the embodiment described therein, too, the envelope is formed by folding in the bag, optionally together with the thread and the label, this unit being sealed from the envelope and the bag for forming a U-shaped seam. To this end, the sealing station can connect the opposed sheets of the envelope by means of welding. However, other types of connection, such as knurling or gluing, are also conceivable. These connection types can also be applied in combination.

The sealing station has a sealing jaw element and a jaw counter element which clamp or press the envelope between them completely or partially during sealing. Each of these jaw elements can have a sealing surface corresponding to the contour of the sealing to be made, or only partially form the same. In other words, the jaw elements to be placed against the envelope on the opposite side can form the sealing surface by themselves each completely, or only a portion thereof. In the latter case, a plurality of jaw elements are usually provided on either side of the envelope which form a sealing surface by their cooperation which corresponds to the contour of the sealing at the envelope.

In the process, a U-shaped continuous sealing surface is typically formed on either side of the material of the envelope to be sealed by the sealing jaw element(s) or the counter-jaw element(s). Each U-shaped sealing surface is placed against the envelope material from one side to place opposite legs of the foil web separated by a fold against each other and press them between the two jaw elements.

A sealing jaw swivel arm is associated with the sealing jaw element. This arm is fixed to the sealing jaw element. A sealing jaw connecting rod is applied at the sealing jaw swivel arm. Said connecting rod is by usual means eccentrically mounted about a drive shaft of a motor. The sealing jaw connecting rod and the sealing jaw swivel arm form a toggle mechanism which brings the sealing jaw element with its sealing surface into a sealing plane and, after the sealing of the envelope, the jaw element into an opened position which permits the withdrawal of the bag sealed into the envelope from the sealing station or the introduction of a non-sealed bag with the envelope. Sealing is effected here in the sealing plane. The opposed and cooperating sealing surfaces of the sealing jaw element and the counter-jaw element are lying in the sealing plane during sealing. In this consideration, the low strength of the envelope material which is pressed and sealed by the jaw elements is left out of consideration.

However, the respective toggle mechanisms consisting of the sealing jaw swivel arm and the sealing jaw connecting rod are rather actuated by a common drive which is a servomotor.

In contrast to prior art, this motor is cyclically reciprocated. In the operation of the sealing station, a rotation of the servomotor by no more than 220 degrees is effected to reciprocate the jaw elements between the two above-described positions, i.e. the sealing position and the opened position.

The device according to the invention can here do without any spring elements which are provided between the drive of the sealing jaw element and the counter-jaw element, respectively, and the sealing surfaces each formed thereby. Thus, the transmission of the torque between the servomotor and the jaw elements placed against each other is even accomplished without any slippage after the jaw elements have been approached. The movement of the servomotor is directly translated into a movement of the jaw elements even when the jaw elements contact each other for the first time and/or contact the bag or the envelope. In prior art the jaw elements are provided each, or at least on one side, with a spring to compensate a not sufficiently matched movement of the jaw elements towards each other, so that the motor can, even after the abutment of the jaw elements against each other or with the interposition of the foil material, perform an unbraked feed motion which is absorbed by tensioning the spring element. In the present invention, each movement of the servomotor typically leads directly to a movement of the jaw elements.

In contrast to prior art, where the motor is running continuously, with the present invention, an angular velocity of the servomotor adapted to the respective phases of the approach can also be adjusted. Thus, the servomotor may be operated at a relatively high speed to mutually approach the jaw elements, whereas the servomotor will be operated at a lower speed when the jaw elements approach the opened position, in particular, however, the closed position and thus the sealing plane.

In the solution according to the invention, the jaw elements associated with each other are each driven by one single servomotor. If on one side of the sealing plane, a plurality of sealing jaw elements or counter-jaw elements are required each for forming the sealing surface, one servomotor is associated with each associated pair of sealing jaw element and counter-jaw element, the servomotor each also controlling the contact pressure between the respective surface proportions of the sealing surfaces which is provided by the corresponding jaw elements. This feed is preferably accomplished by one toggle mechanism each for the sealing jaw element and the counter-jaw element.

According to a preferred development of the present invention, the torque of the servomotor is directly transmitted to the envelope as contact force between the sealing jaw element and the counter-jaw element. The corresponding contact force can be adjusted via the motor control. The torque of the servomotor is, in this preferred embodiment, read out as a measure for the contact force. The contact force is adjusted via the torque. The servomotor can have a torque limit. This torque limit corresponds to the maximum contact force. Due to missing spring elements, the torque of the servomotor is, during the approach of the sealing jaws, a measure for the contact force transmitted therebetween, wherein the rotary motion, i.e. the angular velocity of the drive shaft of the servomotor, is also an exact measure for the speed of the approach of the jaw elements to the sealing plane. Thus, the constructive embodiment of the present invention permits, when spring elements are missing, an exact load-displacement control of the jaw elements on the basis of the torque and the current angular velocity of the servomotor. As already mentioned above, this angular velocity is preferably reduced as the sealing jaws are approaching the sealing plane.

The device according to the invention is preferably configured such that the control aligns, during sealing, the sealing jaw connecting rod in its stretched position, i.e. in the dead center position, and the counter-jaw connecting rod is 20 to 40 degrees, preferably 25 to 35 degrees, before its stretched position. In other words, during sealing, the sealing jaw element does not only approach the sealing plane but there reaches the maximally possible approach to the sealing plane predetermined by the toggle joint, while the counter-jaw element connecting rod is yet before its stretched position, and accordingly performs, with the same angular velocity, an essentially faster approach to the sealing plane than the sealing jaw element. In this manner, the kinematics of the sealing jaws during the approach towards the sealing plane can be controlled exclusively based on the angular relationships and leverage of the respective toggle joints. Finally, the motor control only has to control the movement of the counter-jaw element since due to the angular relationships of the toggle joint with respect to the sealing jaw, the latter is in its stretched position anyway and does not undergo any considerable change of position in case of angular changes of the shaft of the servomotor in a small-angle range. The angular velocity of the servomotor when the two jaw elements are approaching the sealing plane accordingly only corresponds to the movement of the counter-jaw element towards the sealing plane. Thereby, the efforts for an exact control of the jaw elements during the approach to the sealing plane and/or the power of the motor for generating the contact force can be reduced.

Moreover, due to the stretched position of the sealing jaw element, the latter does not exert any moment on the drive shaft of the servomotor. For in the stretched position, the support of the sealing jaw element is merely radial due to the stretched position of the sealing jaw connecting rod. The support force is directed towards the centre of the drive shaft.

According to a preferred development of the present invention, the sealing station is embodied to be adapted to form sealings opposed to each other and a transverse sealing extending transversely thereto at an envelope placed around the bag in a U-shape. This further development accordingly assumes that the envelope is placed around the bag with a fold, this fold already closing the envelope on one side so that only the transverse and longitudinal sealings have to be formed for a flavour-tight enclosure of the bag in the envelope. These longitudinal and transverse sealings are continuously formed at the envelope. Accordingly, each longitudinal sealing directly passes over into a transverse sealing, the longitudinal sealings each originating from the fold. The envelope material is preferably a foil. The device has first and second sealing jaw elements and first and second counter-jaw elements. The first and second sealing jaw elements are each embodied for forming a longitudinal sealing and a section of the transverse sealing. The two first sealing jaw elements in combination form a U-shaped, nearly closed sealing surface which is placed against the envelope material from one side to place opposed legs of the foil web separated by the fold against each other and press them between the two sealing jaws. These sealing jaws are formed on one side by the first and second sealing jaw elements, and on the other side by the first and second counter-jaw elements.

The first and second sealing jaw elements can be moved in different directions towards the envelope and away from the envelope. Thus, a space for introducing the envelope for sealing the same and for withdrawing the sealed packing unit can be created in a manner different from prior art, where this free space is formed by swivelling the two sealing jaws.

In this preferred solution, the first and second sealing jaw elements of each individual sealing jaw can be moved in a translatory and/or rotatory manner to form the corresponding free space. In particular, the two sealing jaw elements can be spaced apart to introduce the envelope therebetween. When the sealing jaws are open, an approach of the first and second sealing jaw elements will typically already be performed after the envelope with the bag in-between has been provided between the essentially opposed first sealing jaw elements of an upper and a lower sealing jaw and second sealing jaw elements of the upper and lower sealing jaw. Insofar as the upper and the lower sealing jaw are referred to, this is mainly done for being able to distinguish between the individual components of the sealing jaw. The upper and lower sealing jaws enclose the envelope between them during sealing. The first and second sealing jaw elements can each be provided at the upper and lower sealing jaws. The first, the second and optionally a third or fourth sealing jaw element are accordingly located on one side of the envelope during sealing.

Designs where an identical design of the sealing jaws is realized both on the upper side and on the bottom side of the envelope are preferred.

The sealing jaw elements preferably have an L-shape, wherein one leg realizes the sealing surface for the longitudinal sealing, and another leg forms a section of the sealing surface for the transverse sealing. During sealing, the two legs forming the sections of the transverse sealing usually abut against each other or are lying close to each other, so that despite the division of the sealing jaws into a first and a second sealing jaw element, a transverse sealing continuously running from one corner to the other corner may be created.

One first servomotor each is associated with the first sealing jaw element and the first counter-jaw element. This motor is actively connected with the connecting rods of the corresponding jaw elements, i.e. coupled thereto in a driving manner. Similarly, the second sealing jaw element and the second counter-jaw element are actively connected with a drive shaft of a second servomotor via the connecting rods associated with them. Thus, the control of the contact force between the sealing jaw element and the counter-jaw element is each accomplished via the servomotor associated therewith. The servomotors are synchronized, so that the first and second counter-jaw elements are approached to the sealing plane at the same time and in the same direction. The same applies to the first and second counter-jaw elements. The preferred embodiment discussed herein accordingly offers the advantage of a fast and thus economic sealing of the envelope. The envelope can be faster introduced into the free space between the sealing jaws, sealed therein, and be withdrawn from the free space after sealing.

If, for example, the envelope is brought into a sealing position via a rotating transport wheel in which position the sealing jaws press the envelope material between them, the free space receiving the base of the envelope folded around the bag can be formed by spaced-apart first and second sealing jaw elements on the upper side and on the bottom side. Already when the sealing position is approached, the respective sealing jaw elements are moved towards each other so that they receive the envelope material between them and finally, at the end of the feed motion, do not only cooperate with each other to complete a U-shaped sealing surface, but also press the envelope material between them. The transport wheel and the sealing station are normally operated with the clocking of the bag manufacturing means.

Preferably, the respective sealing jaw elements are mounted in a swivelling manner, a sealing jaw swivel arm being provided to this end which supports the first or the second sealing jaw element. The swivelling axis of this sealing jaw swivel arm extends inclined to the longitudinal and transverse sealings and accordingly transversely to the webs of the L-shaped sealing area already mentioned above. Preferably, this inclined position is such that the swivelling axis extends exactly at an angle of 45° with respect to the longitudinal and transverse sealings typically provided perpendicularly with respect to each other. However, the angle can deviate from this preferred orientation by +/−15°, preferably +/−10°, particularly preferred +/−5°.

The sealing jaw swivel arm can be driven by a torque imparted by the swivelling axis. Thus, the sealing jaw swivel arm can be arranged at the shaft of a motor which predetermines the swivelling axis.

The inclined position of the swivelling axis causes the two legs of the L-shaped sealing jaw elements to depart from both the longitudinal edge and the transverse edge of the envelope during swivelling. The longitudinal edge is formed by the opposed longitudinal borders of the legs, whereas the transverse edge typically extends perpendicularly thereto and is provided opposite the fold. With respect to good kinematics, it is to be preferred to provide the swivelling axis offset with respect to a sealing plane in which the envelope is arranged in the sealing position. While the sealing surface typically extended, during the sealing process, in parallel to a plane containing the swivelling axis, the swivelling axis is clearly offset with respect to this plane.

The sealing jaw swivel arm typically has an essentially L-shaped form, wherein one end of the sealing jaw swivel arm is mounted in a swivelling manner about the swivelling axis, and the other end supports the associated sealing jaw element. Between these two ends, a connecting rod is typically applied which is normally articulated to the swivel arm. The connecting rod is driven via a drive shaft with respect to which the connecting rod is arranged eccentrically. The connecting rod is here, as usual, mounted to be freely rotating about an eccentric of the drive shaft. The drive shaft typically extends in parallel to the swivelling axis since not only the sealing jaw swivel arm is driven via the drive shaft, but also a counter-jaw swivel arm cooperating with one of the first and/or second sealing jaw elements and causing, together with this sealing jaw element, a sealing of the envelope material. This counter jaw swivel arm, too, is mounted in a swivelling manner, however, with respect to a motion during the drive of the drive shaft in an opposite direction, on an opposite side with respect to the joint centres of the connecting rod. The swivelling axis associated with the sealing jaw, referred to as sealing jaw swivelling axis below, correspondingly takes up the points of application of the connecting rods between the other swivelling axis, referred to as counter-jaw swivelling axis below, and itself.

In the previously described preferred embodiment, wherein each sealing jaw is formed by two jaw elements formed in an L-shape, the device preferably has two drive shafts, one drive unit as a motor being associated with each of them. Each of the two drive shafts correspondingly has a separate drive. This drive preferably is a servomotor.

The respective drive shaft is provided for driving one of the sealing jaw elements and one of the counter-jaw elements each. This counter-jaw element is the counter-jaw element which cooperates with the corresponding sealing jaw element for pressing the envelope. One single drive shaft is accordingly preferably associated with the upper and the lower jaw element and feeds them towards each other, so that the two jaw elements, i.e. the sealing jaw element and the counter-jaw element, are moved in synchronism by the single drive shaft. The second drive shaft similarly feeds the other pair of jaw elements which press the envelope between them. Each drive shaft extends in parallel to the swivelling axes of the sealing jaw and the counter-jaw swivel arms associated with the drive shaft.

The two drive shafts are preferably oriented perpendicularly with respect to each other. The same applies to the swivelling axes associated with the respective pairs, of which preferably four are provided to mount each the sealing jaw element and the counter-jaw element of the first pair in a swivelling manner towards each other and away from each other, and to similarly mount the sealing jaw element and the counter-jaw element of the second pair in a swivelling manner.

According to the invention, there is furthermore provided a method of manufacturing a bag provided in an envelope and containing a brewable material with a bag manufacturing means configured to manufacture a bag containing brewable material, wherein in a sealing station, an envelope placed around the bag is pressed and sealed between a sealing jaw element and a counter-jaw element, in which method the contact force between the sealing jaw element and the counter-jaw element is controlled via the torque of a servomotor actuating the sealing jaw element and/or the counter-jaw element.

It is preferred that in the inventive method during the sealing process, the sealing jaw connecting rod is arranged in its stretched position (dead center position), and the counter-jaw connecting rod is arranged 20° to 40°, preferably 25° to 35°, before its stretched position.

In the inventive method, the servomotor is preferably operated in a cyclically reversing manner.

BRIEF DESCRIPTION OF THE DRAWINGS

Further details and advantages of the present invention can be taken from the following description of an exemplified embodiment in connection with the drawing. In the drawings.

DETAILED DESCRIPTION

Figure 1:
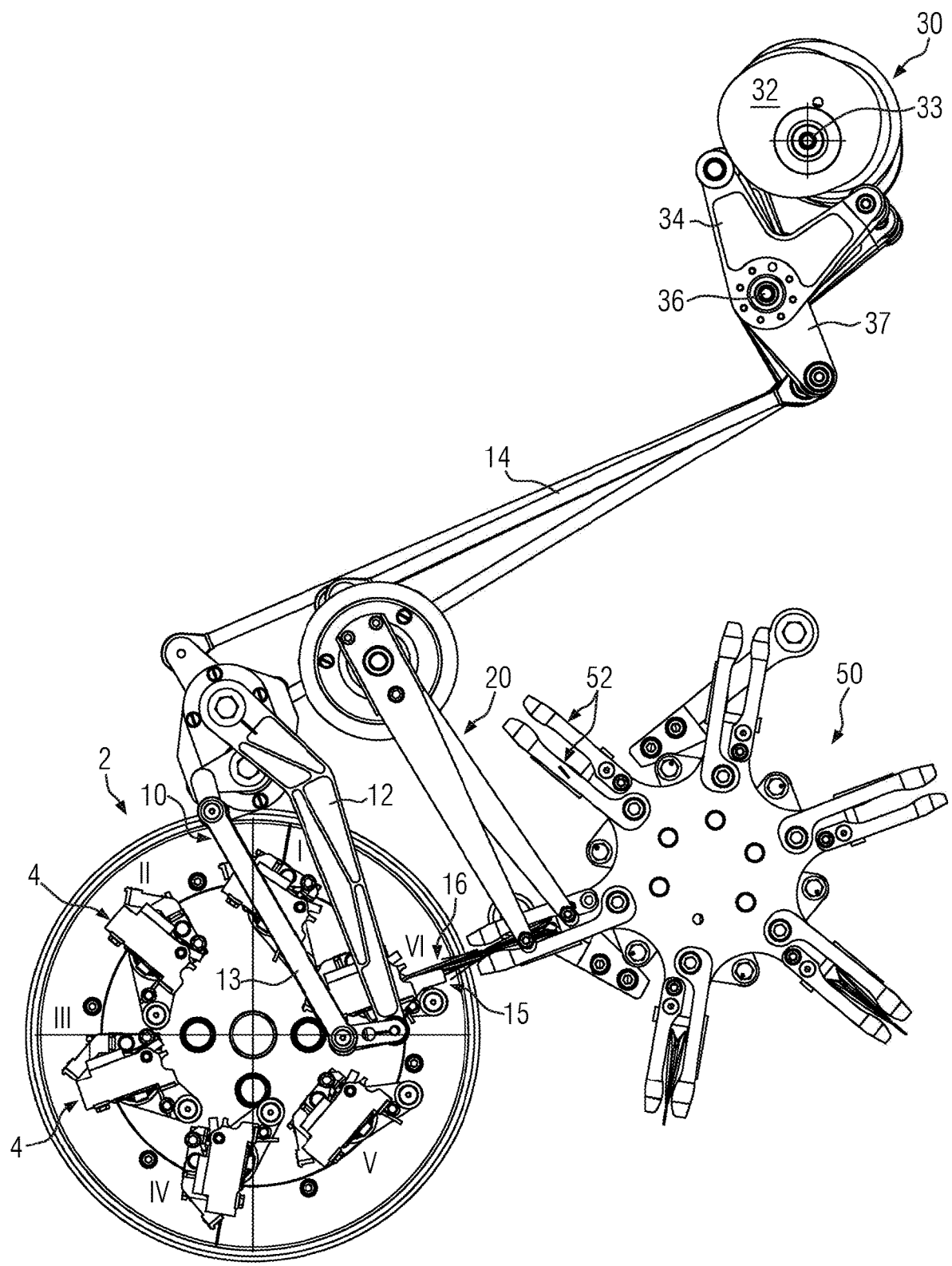
FIG. 1 shows a side view of essential parts of an exemplified embodiment of a device for manufacturing an enveloped bag.

The exemplified embodiment shown in FIG. 1 includes a bag manufacturing means designated with reference numeral 2, and a transport wheel designated with reference numeral 50.

The bag manufacturing means 2 comprises a carousel with a plurality of mountings 4 rotating about an axis for receiving an envelope permeable to water, which is, for forming the bag containing a brewable material, reshaped and typically connected with a thread and a label. With respect to the individual stations and their designs, reference can be made to prior art, for example EP 2 231 479 B1 or WO 01/62600 A1. Reference numerals I to VI designate in FIG. 1 various positions in which the mountings 4 can be located to receive and process the different components of the finished bag or bag to be finished. Elements acting herein are not shown for the sake of a clear representation. In position VI, the bag is finished.

Figure 2:
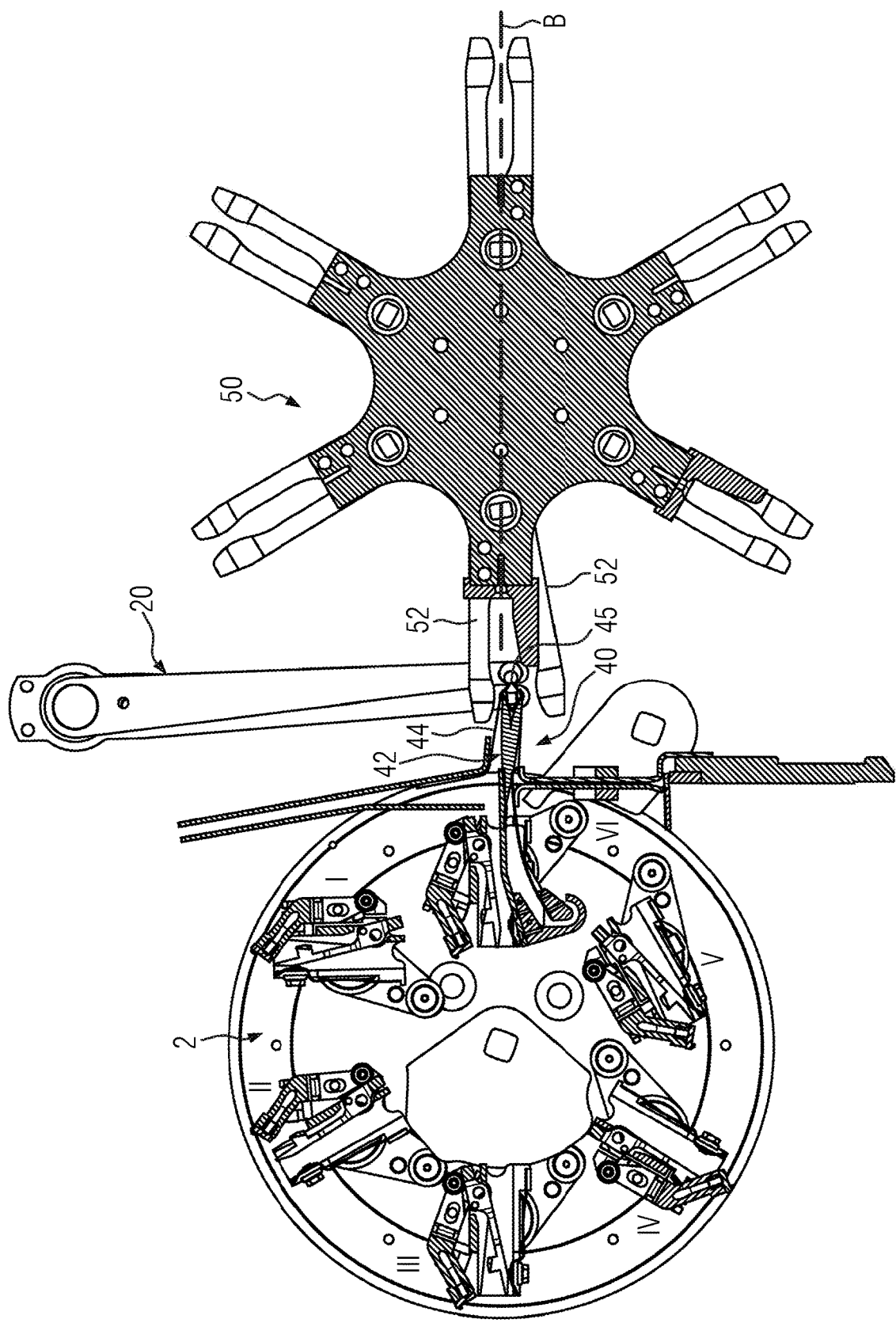
FIG. 2 shows the bag manufacturing means shown in FIG. 1 in an enlarged representation while the bag and the foil are being pushed out.

FIGS. 1 and 2 show elements of a bag handling means designated with reference numeral 10, and an envelope material handling means designated with reference numeral 20. The envelope material of the shown exemplified embodiment is a flavour-tight foil. This is why in the following description, reference is made to a foil handling means 20. The bag handling means 10 comprises two arms 12, 13, which extend approximately in parallel and are articulated to each other and coupled to a common drive means 30 via coupling rods 14. This common drive means 30 has various cam discs 32 which are fixed on a common drive shaft 33 of the drive means 30 in a torque-proof manner and are coupled to take-off means 34 in which the outer peripheries of the cam discs 32 each roll off, the take-off means 34 being separately mounted on a common bearing axis 36 in a swivelling manner and provided with a lever 37 which is articulated to the corresponding coupling rod 14. The coupling rods 14 act on the arms 12, 13 via levers.

The drive shaft 30 actuates both the individual components of the bag handling means 10 and the components of the foil handling means 20. Thus, both handling means 10, 20 are provided with a common drive and forcibly synchronised.

As can be taken from FIG. 2, a foil 40 schematically represented in FIG. 1 is pushed, together with a bag 42, out of the bag manufacturing means 2 and towards the transport wheel 50, wherein a fold 45 formed by folding the material of the foil 40 and formed between two legs 44 of the foil 40, is leading, and the bag 42 is following. The foil handling means 20 is applied at the foil 40 at the border thereof. The bag 42 is pushed out from behind by actuating a clamping shoe 15 with a clamping spring 16 by moving the clamping shoe 15 together with the clamping spring 16 together with the front ends of the front and rear bag handling arms 12, 13 radially away from the bag manufacturing means 2. At the end of this movement, the bag 42 is placed into the folded-in foil 40 and clamped between the clamping arms 52 of the transport wheel 50.

A sealing station 100 depicted in FIGS. 3 to 9 includes sealing jaws designated with reference numerals 102 and 108, wherein the sealing jaw 102 represented each in the bottom of FIGS. 3 to 9 is formed of a first sealing jaw element 104 and a second sealing jaw element 106. Similarly, the upper sealing jaw 108 represented above them consists of two jaw elements which will be referred to as counter-jaw elements 110 and 112 below. As can be in particular seen in FIG. 6, each sealing jaw element 104, 106 is embodied in an L-shape in the plan view and has a long leg 113, and a short leg 114 extending perpendicularly thereto. The long legs 113 each form a longitudinal sealing by which the opposed legs 44 are joined at their longitudinal sides. The two short legs 114 together form a sealing surface of each of the sealing jaws 102, 108, which are embodied to be adapted to form a transverse sealing and create the latter at the foil 40 such that the transverse side of the foil material situated opposite the fold 45 is sealed. The longitudinal sealings and the transverse sealings permit a hermetic enclosure of the interior of the foil package. The fourth side is closed by the fold 45.

The sealing jaw element 104 and the counter-jaw element 110 (each the left portion of the sealing jaws according to FIGS. 3 to 9) are driven by a common drive 115 in the form of a servomotor. To this end, connecting rods are provided eccentrically to a drive shaft 116 of the drive 115, of which the connecting rod provided adjacent to the drive 115 is associated with the counter jaw 110 and will correspondingly be referred to as counter-jaw connecting rod 118 below, and the other connecting rod, which is provided on the side of the counter-jaw connecting rod 118 opposite to the drive 114, will be referred to and is designated as sealing jaw connecting rod 120.

This sealing jaw connecting rod 120 is freely rotating and eccentrically mounted at the drive shaft 116. The other end of the sealing jaw connecting rod 120 is articulated to a joint centre designated with reference numeral 122 at a sealing jaw swivel arm 124, which supports the sealing jaw element 104 at its one end and is, at its other end, mounted in a swivelling manner about a swivelling axis 126 referred to as sealing jaw swivelling axis below.

Correspondingly, the counter-jaw connecting rod 118 is articulated to a counter-jaw swivel arm 128 which supports the counter jaw 110 and is mounted at its opposite end to a counter-jaw swivelling axis 130 in a swivelling manner. With reference to the orientation of the sealing jaws 102, 108 according to the representations, in particular in FIGS. 5 and 9, reference will be sometimes also made to the upper sealing jaw 108 and the lower sealing jaw 102 below. The lower sealing jaw 102 consists of the lower sealing jaw elements 104, 106. The upper sealing jaw 108 consists of the upper sealing jaw elements 110, 112.

Figure 5:
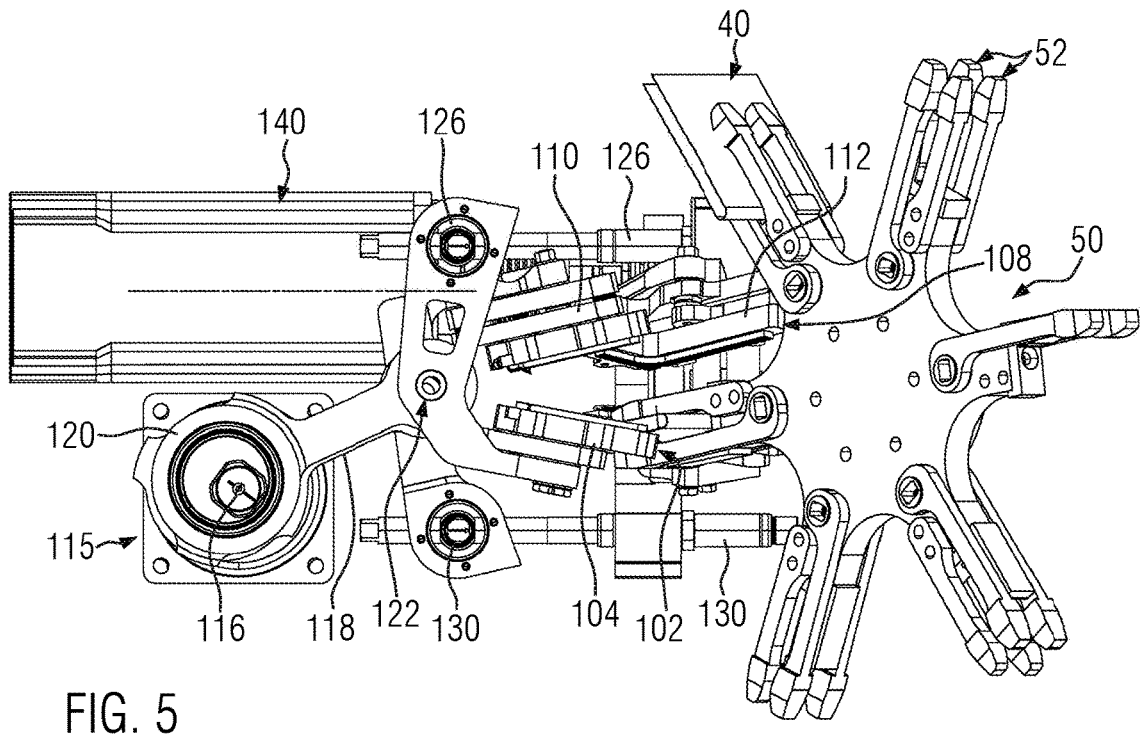
FIG. 5 shows a side view of the sealing station of the phase illustrated in FIGS. 2 and 3.
Figure 7:
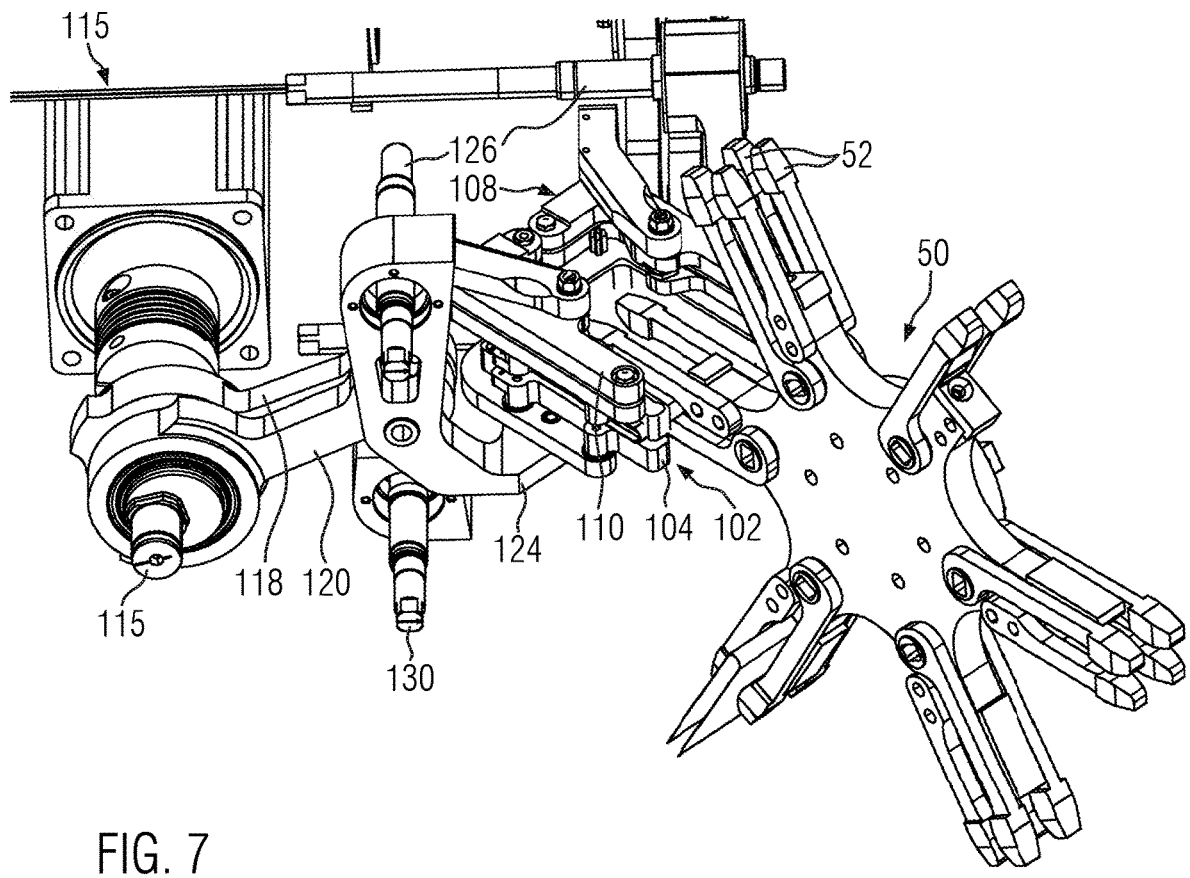
FIG. 7 shows a view according to FIG. 2 during the sealing of the envelope.
Figure 9:
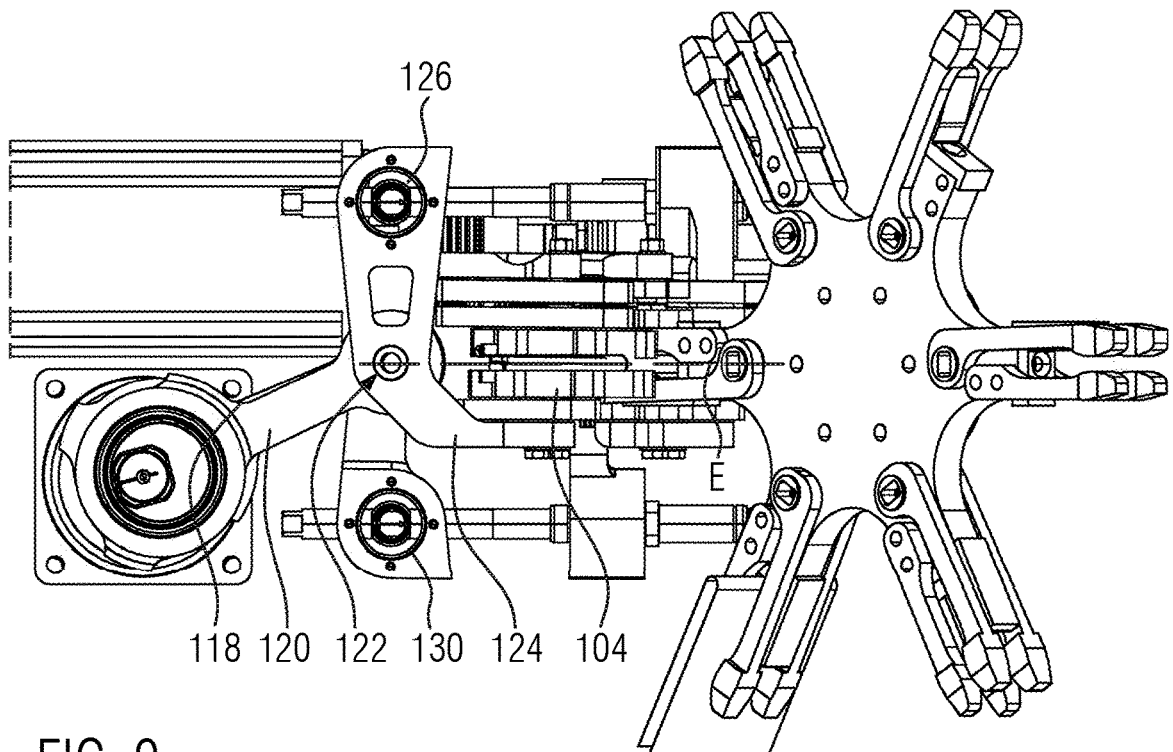
FIG. 9 shows a representation according to FIG. 4 in the phase according to FIGS. 5 and 6.

The two swivelling axes 126, 130 are—as can be in particular seen in the side views according to FIGS. 5 and 9—provided between the sealing jaws 102, 108 and the drive shaft 116. A sealing plane designated with reference numeral E in FIG. 9, in which the foil 40 is located during the formation of the sealing, extends perpendicularly to a connecting line which connects the two swivelling axes 126, 130 with each other. Approximately halfway of this section, there are the joint centres of which only the joint centre 122 of the sealing jaw connecting rod 120 can be seen in the drawing.

Figure 4:
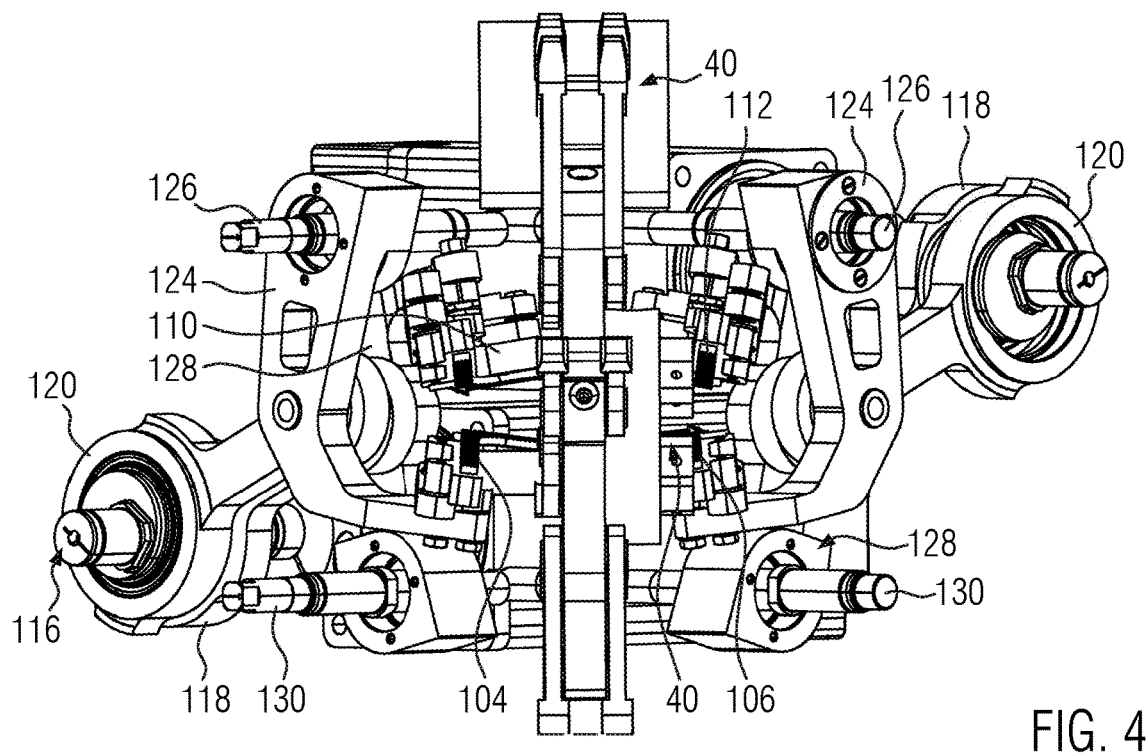
FIG. 4 shows a plan view of the exemplified embodiment of the sealing station perpendicular to the axis of rotation of the transport wheel according to FIG. 2 in the phase illustrated in FIG. 2.

In the manner described above, the elements for sealing the foil 40 each to be seen in FIG. 4 on the right side, i.e. the sealing jaw element 106 and the counter-jaw element 112, are supported and movably mounted. As can be in particular seen in FIG. 6, two drives 115, 140 are provided whose drive shafts 116, 142 extend perpendicularly with respect to each other. The drives 115, 140 are provided in an overlapping manner whereby a relatively compact design is given. The essential components of the sealing station 100 are arranged about an axis A in a laterally reversed manner, mirrored on the base, the axis A intersecting the point of intersection of the two drive shafts 116, 142, going through the separation between the short legs 114, and extending perpendicularly with respect to an axis of rotation of the transport wheel 50.

As results from the above description, for the first and the second pairs of sealing jaw elements 104, 110; 106, 112, toggle joints are provided each, wherein the toggle joint to the sealing jaw element 104 comprises the sealing jaw connecting rod 120, and the toggle joint to the counter-jaw element 110 comprises the counter-jaw connecting rod 118. Here, the two connecting rods 118, 120 are mounted rotatably about the common drive shaft 116 and supported by the latter. They are mounted eccentrically with respect to this drive shaft 116. The eccentrics, however, are offset at angles with respect to each other.

Figure 3:
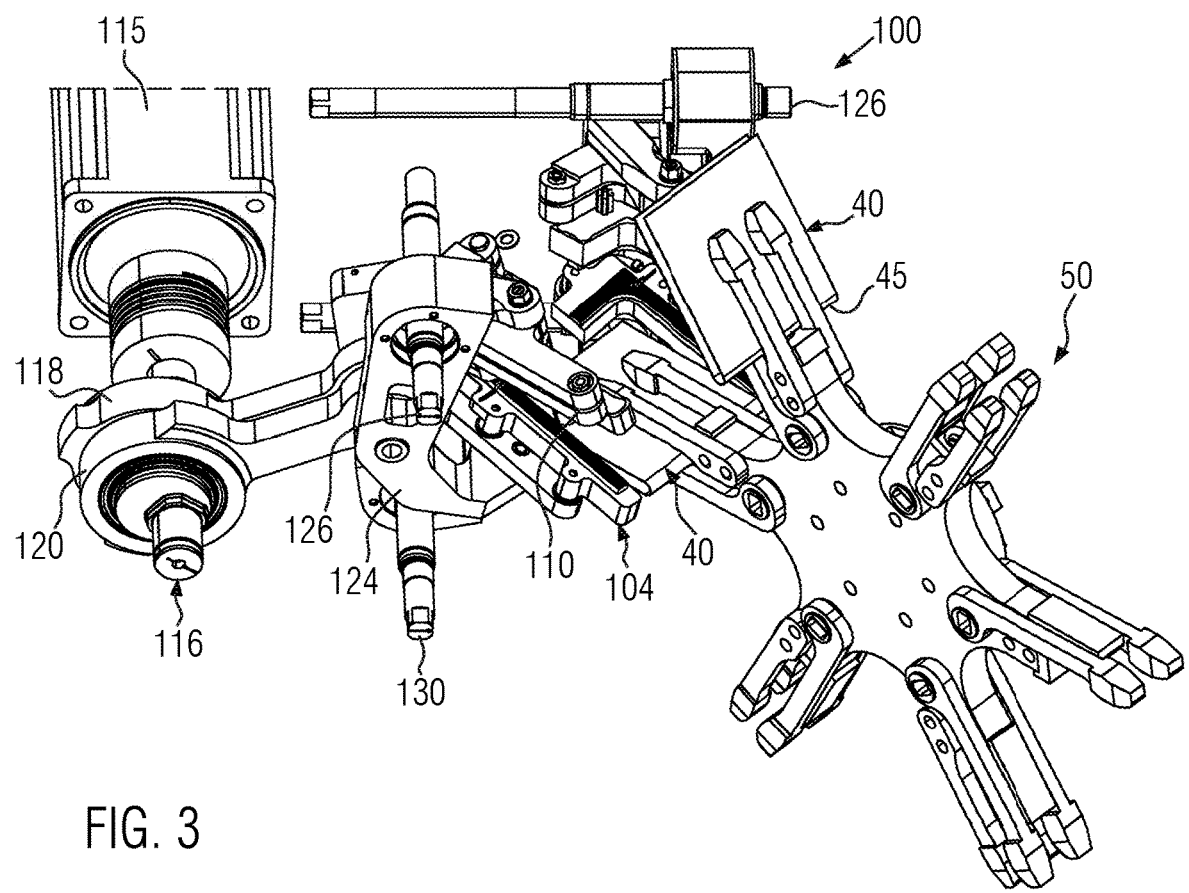
FIG. 3 shows a perspective plan view of the sealing station of the exemplified embodiment according to FIG. 1 with the sealing jaws being open.

FIGS. 3 to 5 show a phase during the operation of the sealing station 100 before the foil 40, at the top in FIGS. 3 to 5, is introduced between the sealing jaws 102, 108. The sealing jaws 102, 108 are open. Specifically, the sealing jaw elements in the view according to FIG. 4 are swivelled as follows: the sealing jaw element 104 to the bottom and to the left, the sealing jaw element 106 to the bottom and to the right, the counter-jaw element 110 to the top and to the left, and the counter-jaw element 112 to the top and to the right. This swivelling motion is caused by the respective toggle joints. As is illustrated in FIG. 5, the larger radii of the respective eccentrics to the respective connecting rod 118, 120 are located on the side of the drive shaft 116 opposite the sealing jaws 102, 108. The long legs 113 extend in parallel to this axis A, the short legs 114 perpendicularly thereto, the swivelling axes 126, 130 are each inclined by 45° with respect thereto. The swivel arms 124, 128 are correspondingly nearly maximally swivelled towards the drive shaft 116. The free space provided between the sealing jaws 102, 108 permits the introduction of the folded foil 40 without the latter colliding with the sealing jaws 102, 108. This introduction is effected by the rotation of the transport wheel 50. The rotation is stopped when the folded foil 40 has reached the sealing plane E. During the approach of the foil 40 to the sealing plane E, the sealing jaws 102, 108 are already closed by the clockwise rotation of the drive shaft 116 according to FIGS. 5 and 9. Reference is made to the drive shaft designated with reference numeral 116 in these figures. The other drive shaft 142 is driven here in the opposite direction.

The sealing position is represented in FIGS. 6 to 9. The sealing jaws 102, 108 abut against each other. Specifically, the sealing jaw element 104 abuts against the counter-jaw element 110, and the sealing jaw element 106 abuts against the counter-jaw element 112. Thus, each pair of jaw elements 104, 110; 106, 112 associated with each other is closed while they are enclosing the foil 40. Moreover, the short legs 114 of the respective jaw elements 104, 106, 110, 112 also contact each other.

As is in particular illustrated in FIG. 9, the sealing jaw connecting rod 120 associated with the lower sealing jaw 102 is in its stretched position. A straight line intersecting the joint centre 122 and the drive shaft 116 accordingly goes through the eccentric connected with the drive shaft 116 in a torque-proof manner in its maximum radius. The sealing jaw connecting rod 120 is correspondingly supported only radially and by the bearing of the drive shaft 116.

In contrast, the counter-jaw connecting rod 118 is, in the sense of rotation of the drive shaft 116 until the sealing position is reached, before its stretched position, namely about 30° before its stretched position. In other words, the respective sealing jaw element 104, 106 has already reached its maximally possible highest position (based on the representation according to FIG. 9), while the clockwise rotation of the drive shaft 116 leads to a further considerable approach of the counter-jaw element 110. The torque applied by the servomotor as a drive 115 determines, in the shown exemplified embodiment, the contact force between the two jaw elements 104, 110 or 106, 112, respectively. The torque picked off at the drive 115 is used for adjusting the contact force. The torque exactly corresponds to the contact force. In particular, springs or other compression means between the drive 115 and the sealing surfaces of the individual jaw elements 104, 106, 110, 112 are missing. Since the sealing jaw element is in the stretched position of the corresponding toggle joint and the load is correspondingly discharged only radially to the drive shaft via the pertaining sealing jaw connecting rod 120, the moment to be picked off via the motor performance is only determined by the contact force of the counter-jaw element 110, whereby the control of the contact force via the servomotor is facilitated and more precise.

Figure 6:
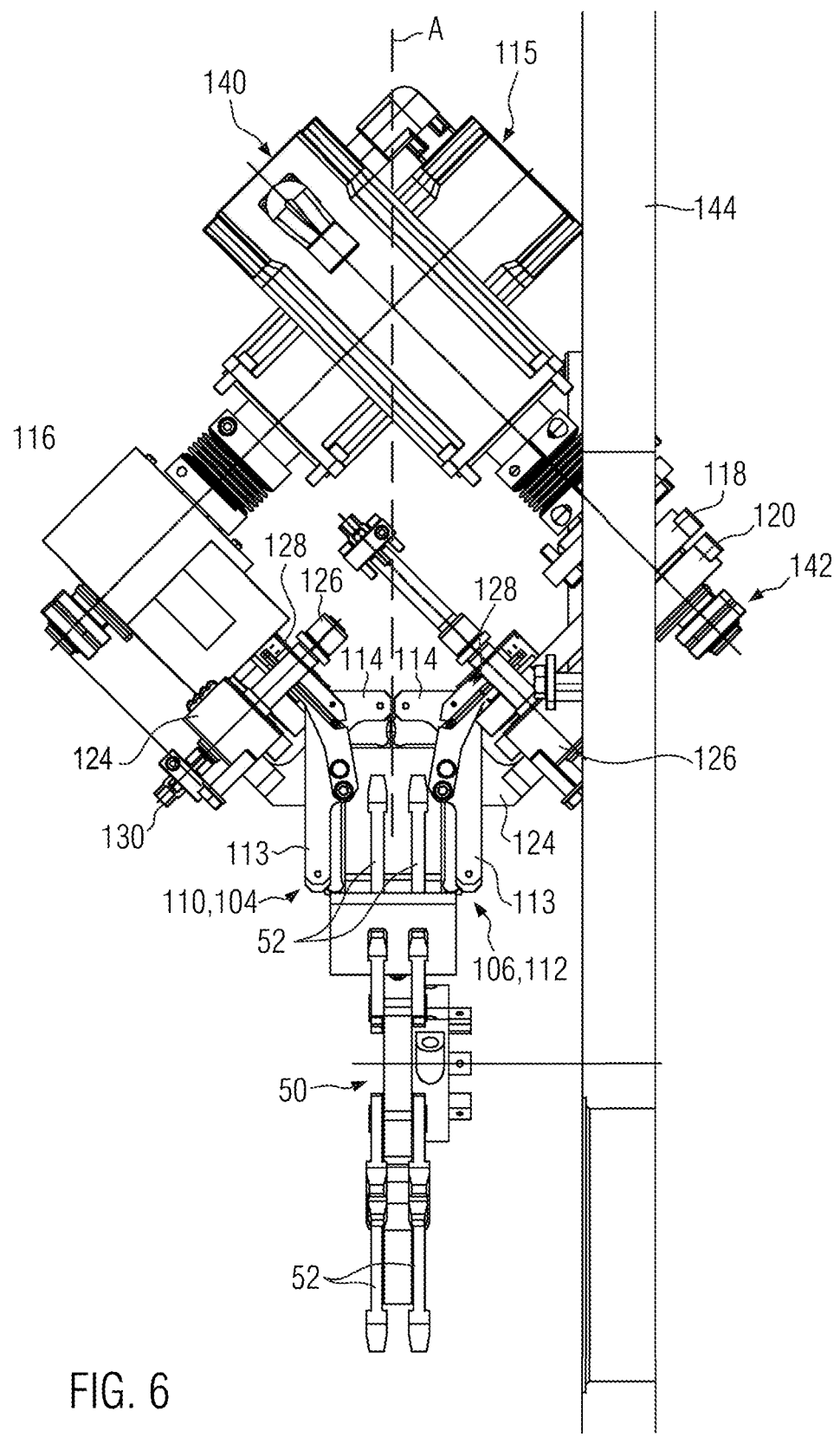
FIG. 6 shows the sealing station in a plan view onto the sealing jaws during sealing.
Figure 8:
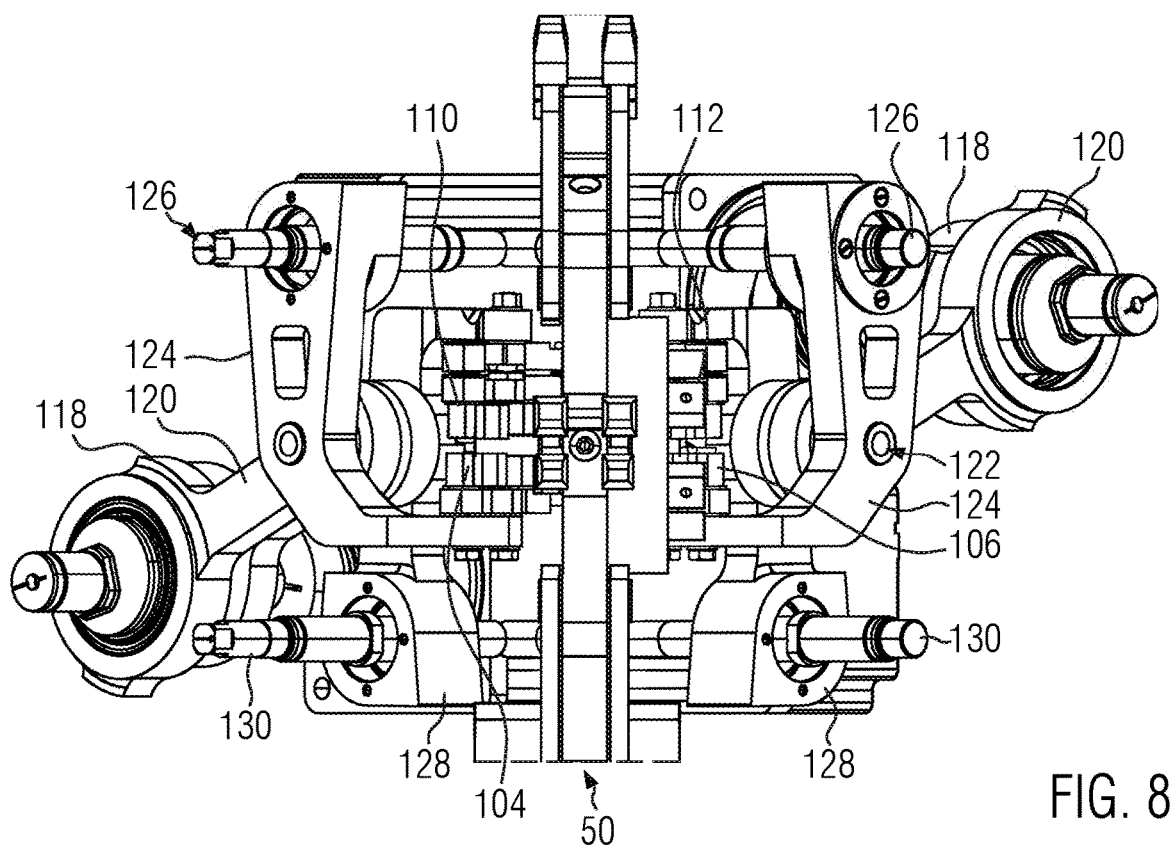
FIG. 8 shows a representation according to FIG. 3 in the phase according to FIG. 7.

FIG. 6 also illustrates the position of the components of the sealing station 100 relative to a wall 144 of a machine which typically exposes, at its outer side (in the left in FIG. 6), the individual stations with their functional components which cooperate with the bag or the bag material, a label or a thread for connecting the bag material with the thread. At the outer side of the wall 144, the operator of the device can also access the latter for fitting the machine or eliminating troubles after having opened a usually at least partially transparent door which covers the components. Behind the wall 144, the transmission or the motor of the machine is usually located. As can be seen, the drive shaft 142 and the connecting rod 118, 129 connected thereto penetrate this partition 144.

Figure 10:
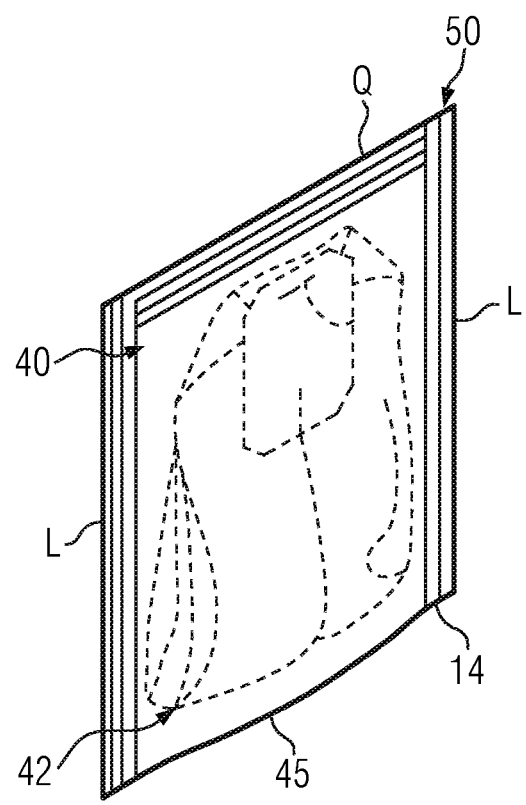
FIG. 10 shows a plan view onto a packing unit consisting of a bag and a foil.

FIG. 10 illustrates the package in the manner described above, consisting of an envelope designated with reference 150 which, as a circumferential envelope, accommodates the bag 42 with the thread and the label represented in a dotted line, and encloses the same in a flavour-tight manner. The envelope 150 has a first broad side which is closed by the fold 45. Longitudinal sealings L depart from this fold at right angles. At the end of these longitudinal sealings L, there is a transverse sealing Q which extends in parallel to the fold 45. The longitudinal and transverse sealings L, Q pass over into each other or penetrate each other.

LIST OF REFERENCE NUMERALS 2 bag manufacturing means
4 mounting
10 bag handling means
12 front bag handling arm
13 rear bag handling arm
14 coupling rod
15 clamping shoe
16 clamping spring
20 foil handling means
30 drive means
32 cam disc
33 drive shaft
34 take-off means
36 bearing axis
37 lever
40 foil
42 bag
44 leg
45 fold
50 transport wheel
52 clamping arm
100 sealing station
102 lower sealing jaw
104 sealing jaw element
106 sealing jaw element
108 upper sealing jaw
110 counter-jaw element
112 counter-jaw element
113 long leg
114 short leg
115 drive
116 drive shaft
118 counter-jaw connecting rod
120 sealing jaw connecting rod
122 joint centre
124 sealing jaw swivel arm
126 sealing jaw swivelling axis
128 counter-jaw swivel arm
130 counter-jaw swivelling axis
140 drive
142 drive shaft
144 wall
150 envelope
A axis of symmetry
E sealing plane L longitudinal sealing
Q transverse sealing
I-VI position of mounting 4

What is claimed is:

1. A device for manufacturing a bag received in an envelope and containing a brewable material comprising:
a sealing station with a sealing jaw element and a counter-jaw element which act on the envelope from opposite sides to seal the bag in the envelope, wherein the sealing jaw element is fixed to a sealing jaw swivel arm at which a sealing jaw connecting rod is applied, and the counter-jaw element is fixed to a counter-jaw swivel arm at which a counter-jaw connecting rod is applied, and the sealing jaw connecting rod and the counter-jaw connecting rod are each eccentrically connected to a common drive shaft of a servomotor, wherein the sealing jaw connecting rod and the counter-jaw connecting rod each include a first end and each first end is mounted to respective eccentric mounting surfaces rotatably coupled to the common drive shaft for eccentric rotation of the sealing jaw connecting rod, the counter-jaw connecting rod, and the respective eccentric mounting surfaces about the common drive shaft, wherein the sealing jaw connecting rod and the counter-jaw connecting rod each include a second end and the second end of the sealing jaw connecting rod is directly coupled to a joint centre and the second end of the counter-jaw connecting rod is directly coupled to the joint centre.

2. The device according to claim 1, wherein a torque of the servomotor is directly transmitted to the envelope as a contact force between the sealing jaw element and the counter-jaw element.

3. The device according to claim 1, wherein during the sealing process, the sealing jaw connecting rod is in a stretched position and the sealing jaw element is along a sealing plane and the counter-jaw connecting rod is 20° to 40°, preferably 26° to 35°, from a stretched position before the counter-jaw element is along the sealing plane.

4. The device according to claim 1, wherein the sealing station is embodied to be adapted to the formation of opposite longitudinal sealings and a transverse sealing extending transversely thereto at the envelope placed around the bag in a U-shape, and comprises a first and a second sealing jaw element which are embodied each to form one of the longitudinal sealings and a section of the transverse sealing, and each cooperate, during the sealing of the envelope, with correspondingly embodied first and second counter-jaw elements, and the first sealing jaw element and the first counter-jaw element are each actively connected with a first drive shaft of a first servomotor via the connecting rods associated therewith, and the second sealing jaw element and the second counter-jaw element are each actively connected with a second drive shaft of a second servomotor via the connecting rods associated therewith.

5. The device according to claim 4, wherein the first sealing jaw element is swivelling via the sealing jaw swivel arm about a first sealing jaw swivelling axis, and the first counter-jaw element is swivelling via a first counter-jaw swivel arm about a first counter-jaw swivelling axis, wherein the first sealing jaw swivelling axis and the first counter-jaw swivelling axis extend in parallel with respect to each other, the second sealing jaw element is swivelling via the sealing jaw swivel arm about a second sealing jaw swivelling axis, and the first counter-jaw element is swivelling via a second counter-jaw swivel arm about the first counter-jaw swivelling axis, wherein the second sealing jaw swivelling axis and the first counter-jaw swivelling axis extend in parallel with respect to each other, and wherein the first swivelling axis extend perpendicularly to the second swivelling axis.

6. The device according to claim 5, wherein the first swivelling axis and the second swivelling axis are each oriented transversely to the longitudinal sealings and the transverse sealing.

7. The device according to claim 6, wherein the first drive shaft essentially extends perpendicularly to the second drive shaft.

8. The device according to claim 1, wherein the second end of the sealing jaw connecting rod and the second end of the counter-jaw connecting rod are each rotatably coupled to the joint centre.

9. A device for manufacturing a bag received in an envelope and containing a brewable material comprising:
a sealing station with a sealing jaw element and a counter-jaw element which act on the envelope from opposite sides to seal the bag in the envelope, wherein the sealing jaw element is coupled with a sealing jaw connecting rod and the counter-jaw element is coupled with a counter-jaw connecting rod, and the sealing jaw connecting rod and the counter-jaw connecting rod each include a first end and each first end is mounted to respective eccentric mounting surfaces rotatably coupled to a common drive shaft of a servomotor for eccentric rotation of the sealing jaw connecting rod, the counter-jaw connecting rod, and the respective eccentric mounting surfaces about the common drive shaft, wherein the sealing jaw connecting rod and the counter-jaw connecting rod each include a second end and the second end of the sealing jaw connecting rod is directly coupled to a joint centre and the second end of the counter-jaw connecting rod is directly coupled to the joint centre, wherein the device is adapted to control a contact force between the sealing jaw element and the counter-jaw element via a torque of the servomotor actuating the sealing jaw element and/or the counter-jaw element.

10. The device according to claim 9, wherein during the sealing process, the sealing jaw connecting rod is arranged in a stretched position and the sealing jaw element is along a sealing plane, and the counter-jaw connecting rod is arranged 20° to 40°, preferably 25° to 35°, from a stretched position before the counter-jaw element is along the sealing plane.

11. The device according to claim 9, wherein the servomotor is operated in a cyclically reversing manner.

12. The device according to claim 9, wherein the second end of the sealing jaw connecting rod and the second end of the counter-jaw connecting rod are each rotatably coupled to the joint centre.

13. A device for manufacturing a bag received in an envelope and containing a brewable material comprising:
a sealing station with a sealing jaw element and a counter-jaw element which act on the envelope from opposite sides to seal the bag in the envelope, wherein the sealing station is embodied to be adapted to the formation of opposite longitudinal sealings and a transverse sealing extending transversely thereto at the envelope placed around the bag in a U-shape, and comprises a first and a second sealing jaw element which are embodied each to form one of the longitudinal sealings and a section of the transverse sealing, and each cooperate, during the sealing of the envelope, with correspondingly embodied first and second counter-jaw elements, and the first sealing jaw element and the first counter-jaw element are each actively connected with a first drive shaft of a first servomotor via connecting rods associated therewith, and the second sealing jaw element and the second counter-jaw element are each actively connected with a second drive shaft of a second servomotor via connecting rods associated therewith, wherein the first sealing jaw element is swivelling via a first sealing jaw swivel arm about a first sealing jaw swivelling axis, and the first counter-jaw element is swivelling via a first counter-jaw swivel arm about a first counter-jaw swivelling axis, wherein the first sealing jaw swivelling axis and the first counter-jaw swivelling axis extend in parallel with respect to each other, the second sealing jaw element is swivelling via the first sealing jaw swivel arm about a second sealing jaw swivelling axis, and the first counter-jaw element is swivelling via a second counter-jaw swivel arm about the first counter-jaw swivelling axis, wherein the second sealing jaw swivelling axis and the first counter-jaw swivelling axis extend in parallel with respect to each other, and wherein the first swivelling axis extend perpendicularly to the second swivelling axis.

14. The device according to claim 13, wherein the first swivelling axis and the second swivelling axis are each oriented transversely to the longitudinal sealings and the transverse sealing.

15. The device according to claim 14, wherein the first drive shaft essentially extends perpendicularly to the second drive shaft.

16. The device according to claim 13, wherein the sealing jaw element is fixed to the sealing jaw swivel arm at which a sealing jaw connecting rod is applied, and the counter-jaw element is fixed to a counter-jaw swivel arm at which a counter-jaw connecting rod is applied, and the sealing jaw connecting rod and the counter-jaw connecting rod are each eccentrically connected to a common drive shaft of one of the first servomotor or the second servomotor.

17. The device according to claim 13, wherein a torque of one for the first servomotor or the second servomotor is directly transmitted to the envelope as a contact force between the respective sealing jaw element and the respective counter-jaw element.

18. The device according to claim 13, wherein during the sealing process, a sealing jaw connecting rod is in a stretched position and the sealing jaw element is along a sealing plane and a counter-jaw connecting rod is 20° to 40°, preferably 26° to 35°, from a stretched position before the counter-jaw element is along the sealing plane.

* * * * *